July 9, 1929.  K. LURF  1,720,227
WHEEL LATHE
Filed May 2, 1928
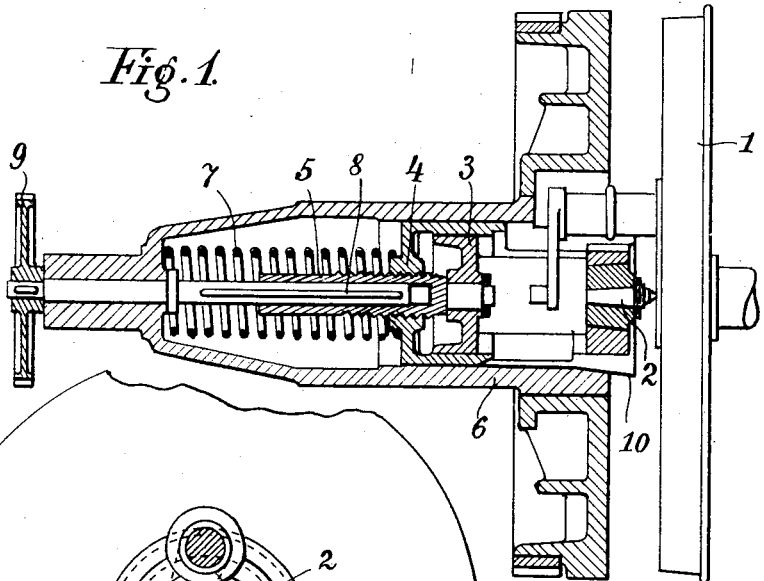
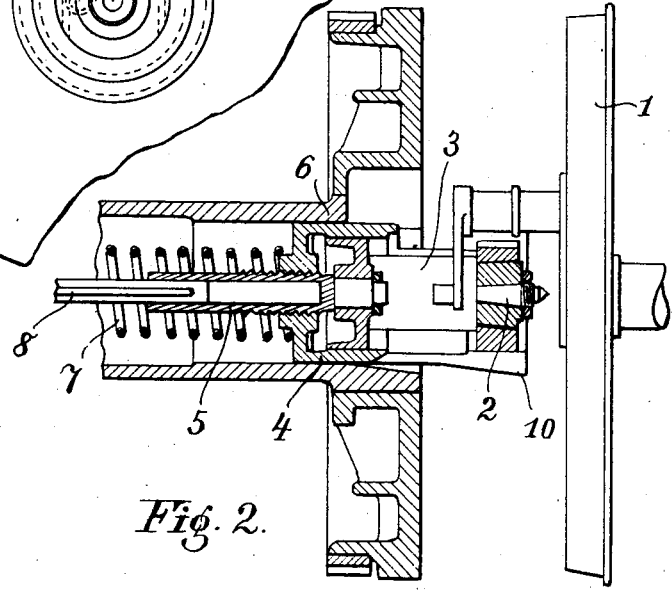
Inventor:
Karl Lurf Patented July 9, 1929.

1,720,227

UNITED STATES PATENT OFFICE.

KARL LURF, OF FRANKFORT-ON-THE-MAIN, GERMANY.

WHEEL LATHE.

Application filed May 2, 1928, Serial No. 274,495, and in Germany April 23, 1927.

My invention relates to wheel lathes for machining locomotive wheels.

In securing locomotive wheels in wheel lathes for machining the tyre of such wheels, many difficulties arise which are caused, on the one hand, by the presence on the wheel of the long crank pin (driving and coupling pin) and, on the other hand, by the controlling crank.

Heretofore the tapered chucks have been constructed as drivers which are guided in the hollow head spindles and are retained in a predetermined position, according to the maximum axial length plus the distance between the centers, after a short movement, by a ratchet bar, a set collar and a stop rigidly secured to the bed. The two head stocks are movable longitudinally of the bed and when moving apart take along the drivers by the friction in the hollow head spindles, until the set collar meets the stop. In this position, the driver is then retained, the centers being at a predetermined distance in front of the axle of the wheel while the head stocks continue to move, until the controlling crank is located in front of the face plate so that the wheel can be easily lifted out of the lathe. Now, if the movement of the two head stocks relative to the wheel is started, the drivers because of the friction in the hollow head spindle are taken along, until the centers meet with resistance in the center apertures in the axle. The drivers now come to rest and while the two head stocks continue their movement, the hollow head spindles together with the face plates slide over the drivers. The centers are only forced into the center holes in the axle of the wheel, when the conical end of the drivers comes to bear against the hollow cone in the head spindle. The movement of the two head stocks is effected by an electric motor or the like, and at the instant when the centers are forced into the center holes of the axle, a maximum automatic device is actuated by the current impulse produced, thus breaking the circuit of the motor. Thereby as well as by the acceleration of the moving masses, the pressure of contact becomes so great that the lifting of the head stocks from the bed is unavoidable, which not only causes the well-known chatter of the lathe, but also in a distortion of the running face profile.

Now, according to the present invention, the axle of the wheel is secured by a counter movement of the center support and the actual clamping sleeve in the hollow head spindle only after the tail stock has been firmly secured to the bed by the motor. The head stock is rigidly screwed down on the bed.

One embodiment of my invention is shown in the accompanying drawing, in which:—

Fig. 1 is a longitudinal section of the clamping mechanism showing a wheel tightly secured thereby.

Fig. 2 is a similar view, the clamping mechanism being opened.

Fig. 3 is a side elevation of the mechanism.

According to the preferred construction, the wheel 1 to be turned is placed into the lathe and mounted on a support movable longitudinally, the controlling crank of the wheel being passed into the free space behind the usual center 2. The latter is mounted on a centering frame 3 comprising a front and rear flange connected together by two strong ribs. This centering frame 3 is mounted in a sleeve 4 in which it is axially displaceable by means of a threaded sleeve 5 mounted on a grooved spindle of the tail stock. The sleeve 4 is guided in the hollow head spindle 6 and tends to be moved to its outermost position (Fig. 2) by a spring 7.

The sleeve 4 is provided with a thin bushing 10, seated in the hollow head spindle 6.

The head stock is firmly screwed down to the bed of the lathe while the tail stock is movable longitudinally of the bed by means of a motor, transmission gear and threaded spindle, or other suitable means.

As the longitudinal movement of the tail stock is started, at first the center of the tail stock enters the center hole of the wheel and forces the wheel in front of it, until the center 2 of the head stock enters the center hole of the axle. On the further movement of the tail stock, the spring 7 is uniformly tensioned, the threaded sleeve 5 acting as a coupling between the center of frame 3 and the sleeve 4 and moving over the grooved spindle 8. As soon as the wheel 1 has assumed the correct position relative to the supports, or the tool (Fig. 1), the tail stock, or the tail stock brake, strikes an adjustable stop.

The tail stock is held on the bed by the motor, whereupon an automatic switch is actuated by the current impulse to open the circuit of the motor. The braking of the tail stock on the bed is assisted by the acceleration of the moving masses and the current impulse. The wheel however is always kept at a uniform distance from the face plate between the centers by the compensated spring pressure. Only when the grooved spindle 8 is given a rotary motion by the transmission gear 9, or by means of a hand wheel, the threaded sleeve 5 moves out of the sleeve 4 and forces the centering frame 3 together with the center 2 firmly into the center hole of the axle of the wheel 1, until the spring pressure is overcome, whereupon the sleeve 4 is drawn into the hollow head spindle 6, until the end of the sleeve 4 is firmly seated within the hollow head spindle 6.

The fact that the sleeve 4 is slotted, not only gives it a firm seating in the spindle 6, but also the front flange of the centering frame 3 is always firmly gripped so that thereby an absolutely secure seating and exact centering of the wheel are obtained without the possibility of the head stock being lifted.

Releasing is effected by operation in the reverse order. At first, the grip is loosened by means of a hand wheel, or the transmission gear 9. The tail stock brake is so arranged that it is automatically released, as soon as a movement in the opposite direction starts. On the tail stock moving away, the wheel is held between the centers by spring pressure, until it has reached the position in which it was first secured, travelling along with the tail stock on the support. The tail stock now moves on by an amount slightly more than double the depth of the center hole and then contacts with a final switch which breaks the circuit of the motor. The wheel can now be easily lifted out of the lathe.

I claim:

In a wheel-lathe for machining locomotive wheels, the combination with the tail stock, of a hollow spindle journalled therein, a yieldingly supported slotted clamping sleeve movable in and out of said hollow spindle, a centering means axially movable in said clamping sleeve, means for positively moving said clamping sleeve and said centering means relative to each other and both relative to said hollow spindle to thereby cause said clamping sleeve to clamp and unclamp said centering means, a face plate carried by said hollow spindle and having a recess therein to provide room for the crank pin and control crank of the wheel, and mechanism for moving said tail stock longitudinally of the bed of the lathe and automatically arresting said movement prior to the wheel being secured in position.

In testimony whereof I affix my signature.

KARL LURF.